United States Patent [19]

Percebois et al.

[11] Patent Number: 5,360,218
[45] Date of Patent: Nov. 1, 1994

[54] PIPE SOCKET JOINT AND SEALING GASKET THEREFOR

[75] Inventors: Alain Percebois, Blenod les Pont-A-Mousson; Philippe Renard, Vandoeuvre les Nancy; Patrick Berraud, Blenod les Pont-A-Mousson, all of France

[73] Assignee: Pont-A-Mousson S.A., Nancy, France

[21] Appl. No.: 3,509

[22] Filed: Jan. 12, 1993

[30] Foreign Application Priority Data

Jan. 13, 1992 [FR] France ................. 92 00262

[51] Int. Cl.5 .................................. F16J 15/12
[52] U.S. Cl. .................. 277/181; 277/207 A; 285/104; 285/105; 285/232
[58] Field of Search ............. 277/166, 181, 189, 190, 277/191, 207 A; 285/104, 105, 232, 340, 374

[56] References Cited

U.S. PATENT DOCUMENTS

| 1,930,194 | 10/1933 | Dillon | 285/104 |
|---|---|---|---|
| 2,201,372 | 5/1940 | Miller | 285/105 |
| 3,724,880 | 4/1973 | Seiler | 285/105 |
| 3,963,298 | 6/1976 | Seiler | 277/207 AX |
| 4,119,333 | 10/1978 | Straub | 285/105 X |
| 4,229,026 | 10/1980 | Seiler | 277/207 AX |
| 4,230,325 | 10/1980 | Butler et al. | 277/190 X |
| 5,067,751 | 11/1991 | Walworth et al. | 285/105 |
| 5,094,467 | 3/1992 | Lagabe | 277/207 A |
| 5,219,189 | 6/1993 | Demoisson et al. | 285/105 |

FOREIGN PATENT DOCUMENTS

| 526373 | 2/1993 | European Pat. Off. | 285/340 |
|---|---|---|---|
| 2094972 | 2/1972 | France . | |
| 2226151 | 12/1973 | Germany . | |
| 2606643 | 8/1977 | Germany . | |
| 2754984 | 6/1979 | Germany . | |

*Primary Examiner*—Scott W. Cummings
*Attorney, Agent, or Firm*—Sughrue, Mion, Zinn, Macpeak & Seas

[57] ABSTRACT

A socket joint for pressurized fluid carrying pipes incorporates a radially-compressed gasket 4 locked in position by toothed inserts 12 each having an inclined face 27 which slides on and bears against a similarly inclined face 26 of a support insert 11 embedded in the anchoring heel 14 of the gasket which is seated in the anchoring throat 7 of the socket.

8 Claims, 4 Drawing Sheets

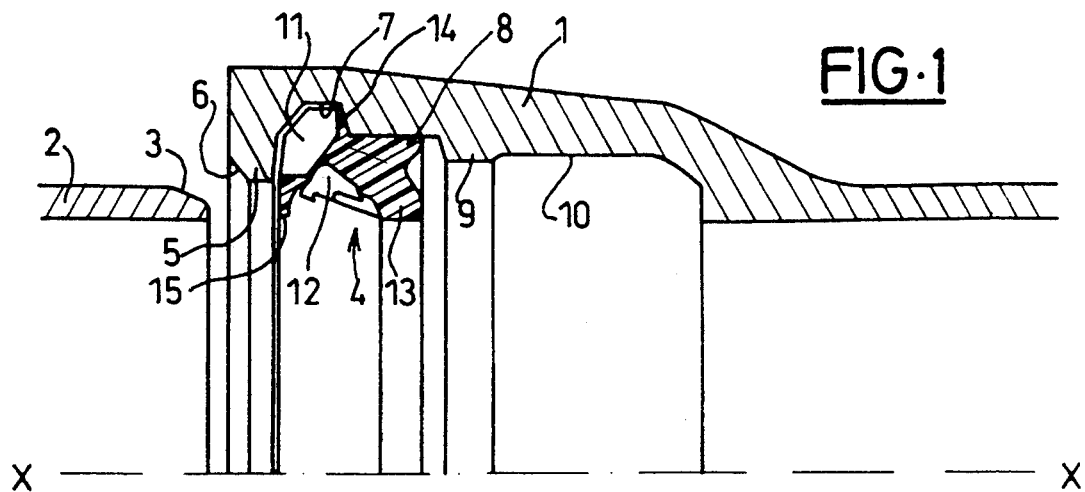
FIG·1
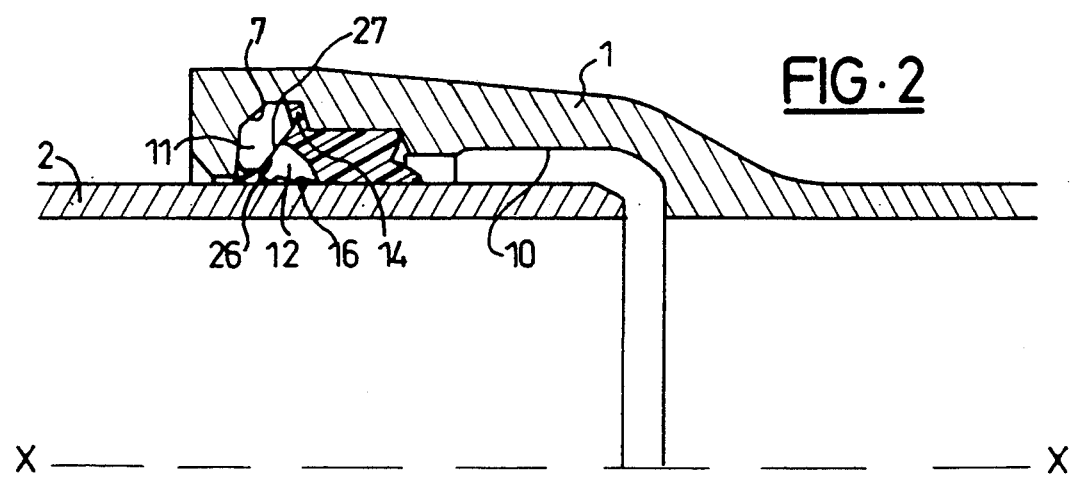
FIG·2
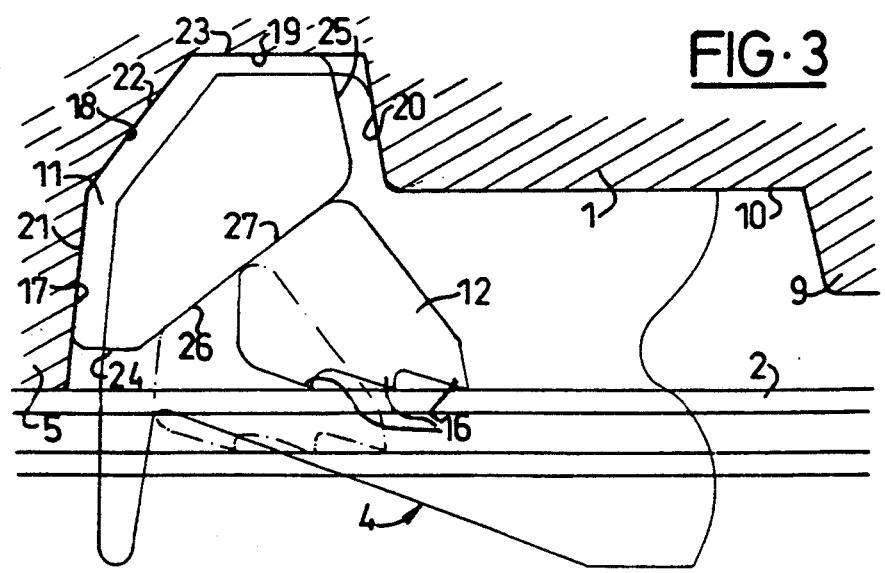
FIG·3

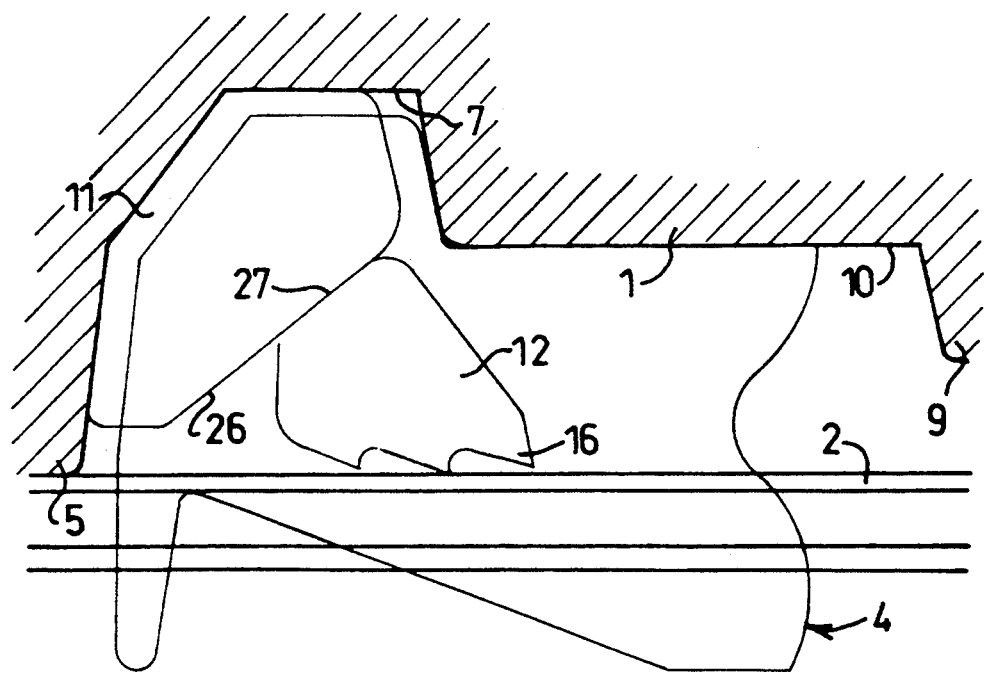
FIG·6
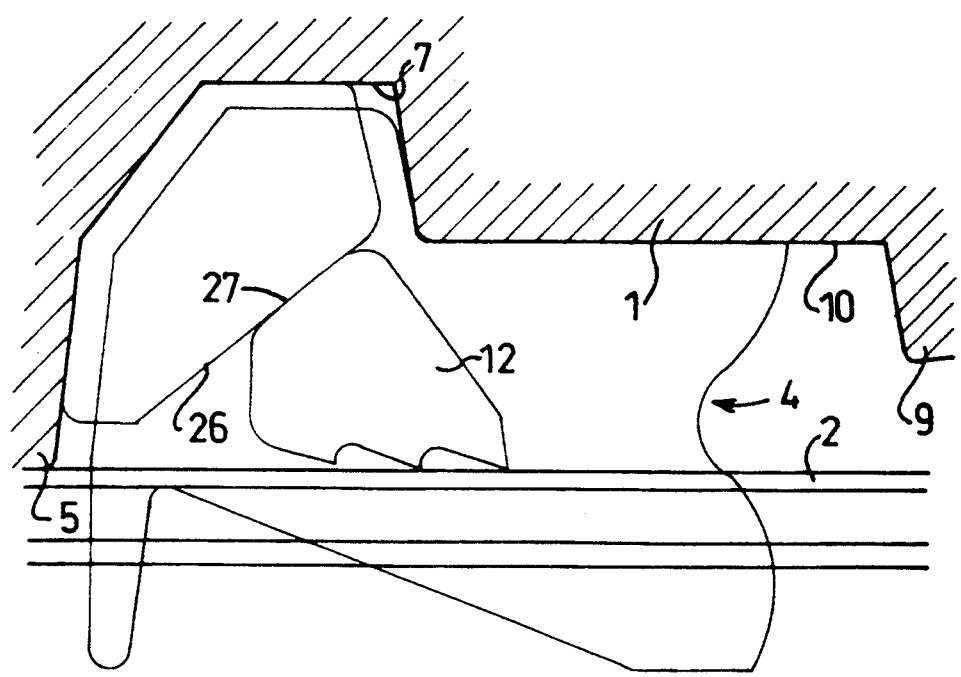
FIG·7

PIPE SOCKET JOINT AND SEALING GASKET THEREFOR

BACKGROUND OF THE INVENTION

This invention relates to an interlocking pipe Joint of the type comprising a male end embedded in a female socket, and a sealing gasket radially compressed between the two. The gasket comprises an annular body made of elastomer and fitted, on the socket-entry side, with an outwardly-projecting anchoring heel housed in an anchoring throat, and, embedded in the elastomer, a fastening collar defined by toothed metal inserts for engaging and retaining the male end. The invention is applicable to the installation of duct-work systems, in particular those made of ductile cast iron pipes, which transport pressurized fluids.

When duct-work systems are pressurized, the male ends tend to travel backwards. The joints must thus be locked in place in order to prevent the accumulated backward movements from gradually causing some Joints to come apart. To avoid the use of costly and/or cumbersome position-retention blocks, various configurations of sealing gaskets incorporating toothed inserts have been suggested. However, none of them have been totally satisfactory, since it has proved difficult to meet all of the applicable requirements simultaneously: i.e., the capacity to support intense axial stresses, maintenance of homogeneous properties over the entire range of pipe diameters despite the fact that they go out of round, protection against corrosion in the locking area in which the insert teeth fasten onto the male end, and bracing of the toothed inserts, which does not lead to the risk of perforation of the male end, when Joint-detachment stresses are intense.

SUMMARY OF THE INVENTION

A purpose of this invention is to provide a solution which fulfills all of the aforementioned requirements in a more satisfactory way than do existing solutions.

To this end, the socket Joint of the invention incorporates support devices embedded in the elastomer making up the anchoring heel of the sealing gasket and having an outer shape which matches the shape of the anchoring throat of the socket. These support devices and the toothed inserts have inclined faces whose contour is more or less linear and which slope in relation to the joint axis, such faces sliding against each other during the male end insertion.

According to other features:
  the support devices and/or the toothed inserts are formed by a series of inserts made of a rigid material and distributed over the periphery of the joint;
  in each plane in which there is a fastening insert, the latter comprises several teeth;
  the tips of all of the teeth are aligned, or can be aligned, on a line parallel to the axis of the socket, when the inclined faces reciprocally support each other;
  alternately, the tip of at least one intermediate tooth or, in a variant, of at least one end tooth, is offset radially in relation to the other teeth; and
  the slope, or average slope, of the inclined faces is between 20° and approximately 40° in relation to the socket axis.

A further purpose of the invention is to provide a sealing gasket working under radial compression and comprising a metal fastening or retaining collar for a socket joint, such as that specified above; and

BRIEF DESCRIPTION OF THE DRAWINGS

FIG. 1 is a half-view in axial cross-section of a socket joint according to the invention, before the insertion of the male end into the socket;

FIG. 2 is an analogous half-view of the Joint in the assembled or inserted position;

FIG. 3 is a view on a larger scale, also in axial cross-section, showing details of FIGS. 1 and 2; and FIGS. 4 to 7 are views analogous to FIG. 3, but relating to several variants of the joint according to the invention.

DETAILED DESCRIPTION OF THE PREFERRED EMBODIMENTS

Figure 4:
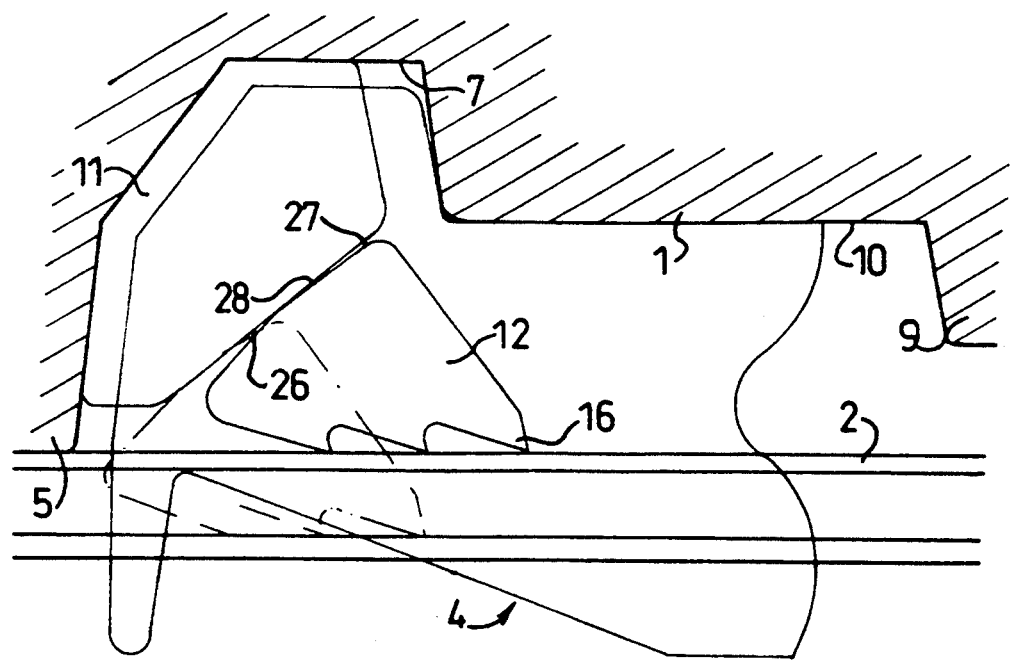

FIG. 1 illustrates the female socket 1 of a first pipe, the male end 2 of a second pipe, externally bevelled at 3, and a radial-compression sealing gasket 4 comprising locking inserts designed to provide simultaneously for fluid-tightness and locking of the two pipes. The two pipes may, in particular, be made of ductile cast iron.

The socket 1 comprises a guide ring 5, whose entrance is bevelled at 6, then, in progression toward the bottom of the socket, an anchoring throat 7, an annular recess 8 of lesser depth, an annular ring 9 which projects radially inwardly to a slight degree, and an end recess 10.

Figure 8:
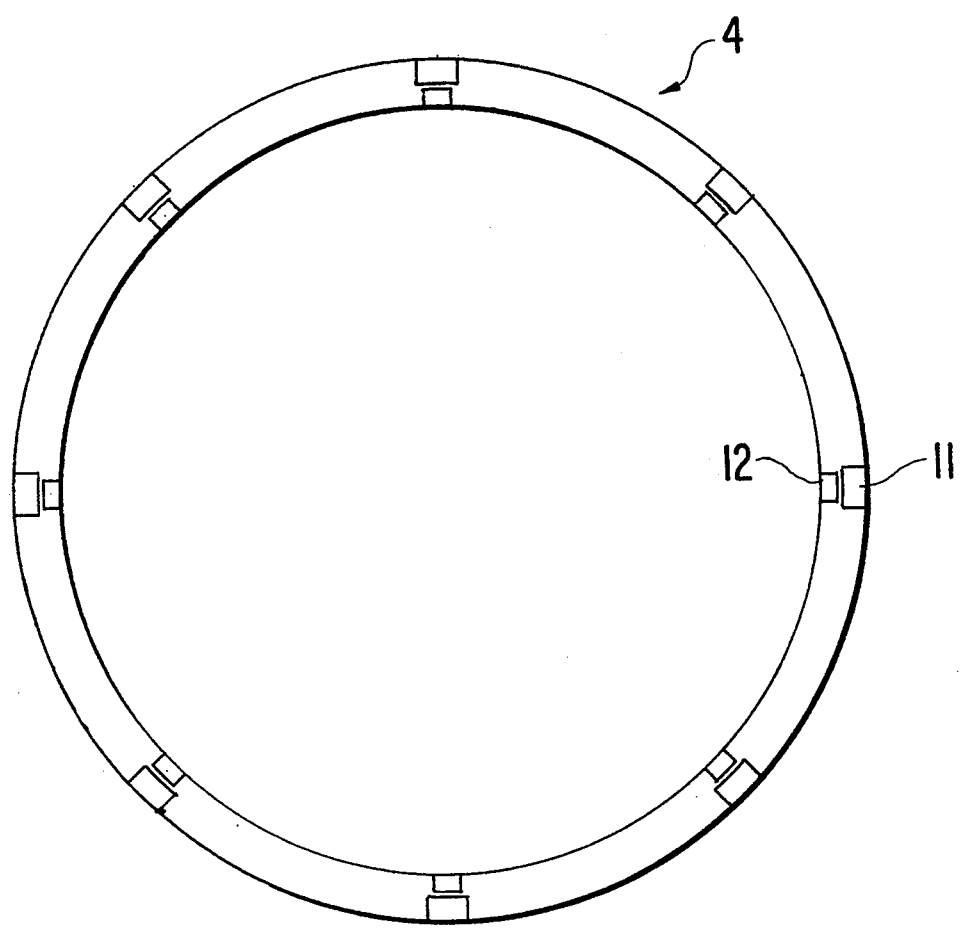
FIG. 8 shows a plurality of support members distributed about the periphery of the gasket.

The gasket 4 is made of an elastomer mass duplicate-molded in a ring comprising pairs of inserts made of a rigid material, and in particular metal inserts, each pair consisting of a support insert 11 and an internally-toothed retaining insert 12. The gasket delimits an inner body portion 13 designed to be compressed radially between the male end and the bottom of the recess 8 and, at the outer end (i.e., at the end closest to the inlet of the socket) of the body portion, an anchoring heel 14 and an internal fluid-tight lip 15 which prevents the penetration of external damaging or corrosive elements into the locking area. Each pair of inserts 11, 12 lies within a single radial half-plane of the gasket, and these pairs are evenly spaced over the periphery of the gasket as shown, for example, in FIG. 8. Note that FIG. 8 is exemplary only, and is not intended to suggest a particular number of inserts or spacing of those inserts.

When the gasket is put in place inside the socket (FIG. 1), the radially-external face of the body 13 is pressed against the peripheral surface of the recess 8, and the heel 14 is housed in the throat 7, while leaving a radially-free space to the outside and to the front. In this situation, as in the case when the gasket is free, the lip 15 is substantially radial, and the teeth of the inserts 12 project outwardly from the internal face of the body 13. The inserts 12 are in contact with the support inserts 11, which are located in the heel 14 and are flush with the outer, front surface of the elastomer. This positioning of the inserts 11 in the anchoring heel 14 makes it possible to stiffen the heel, and thus, to reinforce the anchoring effect produced by the heel 14 in the throat 7 of the socket, thereby enhancing the position-retention of the gasket 4 when the male end is inserted by force or when the duct-work system is pressurized.

The joint is assembled by the simple axial insertion of the male end into the socket. This action causes the lip 15 to fold over forwardly, then pushes the inserts 11 and 12 back radially, the latter sliding along the inserts 11, and compresses the body 13 radially. In this way, the configuration illustrated in FIG. 2 is reached, in which the extremity of the male end is positioned in the recess 10, leaving substantial radial play. The inserts 11 are immobilized in the outer, front portion of the throat 7, and the inserts 12 are in contact with the inserts 11 and, by means of their teeth 16, in contact with the male end.

FIG. 3 illustrates, first, the contour of the gasket positioned in the socket prior to the insertion of the male end, and, second, the final position of the pairs of inserts 11, 12, when a male end 2 having a maximum diameter is positioned in the socket.

As can be seen more clearly in FIG. 3, the throat 7 of the socket incorporates, in succession and beginning at the ring 5, a nearly radial wall 17 sloping slightly forward, a wall 18 whose slope is appreciably more pronounced (i.e., by approximately 45°), a cylindrical bottom 19, and a nearly radial rear wall 20 inclined slightly to the front. Each insert 11 incorporates, toward the rear and externally, three successive surfaces 21 to 23 matching or mating with surfaces 17 to 19, respectively, an internal surface 24 parallel to the axis X—X of the socket, which substantially coincides with the axis of the male end, and, therefore, of the joint, the surface 24 merging with the inner end of the surface 21, a surface 25 nearly parallel to the surface 20 and merging with the inner end of the surface 23, and a flat, inclined support face 26, whose upward and inward slope is between approximately 20° and 40° in relation to axis X—X of the joint. The support face 26 connects the inner end of the surface 24 to the lower end of the surface 25, rounds being used to effect the junctions.

Each insert 12 is roughly quadrangular in shape and has a flat outer face 27 and, opposite the latter, an inner retaining surface delimiting the three teeth 16 of the insert. The inclined face 27 is supported against and works in conjunction with the face 26 of the associated insert 11. Before the insertion of the male end (FIG. 1), the outer part of the face 27 is positioned against the lower part of the face 26. The same configuration exists when the gasket is in the rest position.

During the insertion of the male end 2, the radial compression of the gasket 4 produces, as a first effect, the positioning of the inserts 11 in the outer front corners of the throat 7, as shown in FIGS. 2 and 3; i.e., the surfaces 21 to 23 come to rest against the surfaces 17 to 19, respectively, of the throat. The position of the inclined face 26 in relation to the socket is thus determined with complete precision.

Furthermore, the insertion of the male end causes the faces 27 of the inserts 12 to slide radially outwardly along the inclined faces 26, so that the inserts travel parallel to each other until they reach a position which is a function of the true diameter of the male end in the radial plane. Thus, FIG. 3 illustrates the positions of an insert 12 corresponding to a maximum diameter of the male end (shown in solid lines) and to a minimum diameter of this male end (in broken lines).

In practice, the exact positions of the inserts 11 and 12 as described above are finalized only after the ductwork system is pressurized.

The three teeth 16 are machined such that their tips are aligned along a straight line which, when the faces 26 and 27 work in conjunction with each other, is parallel to the axis X—X of the socket. Thus, whatever the diameter of the male end, the three teeth bite simultaneously into the male end, and, when the male end tends to travel backwards or outwardly, the contact pressure is evenly distributed among them.

Because of the independent functioning of the pairs of inserts 11, 12, the Joints described above can accommodate angular deviations of the male end which, in relation to the socket, can reach approximately 5°.

It should be noted that, whatever the backward travel stress exerted on the male end, the reaction generated on each tooth 16 of each insert 12 has a determinate direction perpendicular to the support face 26, thereby preventing a pivoting movement of the inserts 12 which could perforate the male end.

In practice, the pipes made of ductile cast iron having currently-used diameters, the slope of the inclined faces 26 in relation to the axis of the socket is preferably selected to be between approximately 20° and 40°, as indicated above. In fact, below 20°, the diametrical tolerances allowed for the male end are very small; and, above 40°, the inserts 12 fasten or grip poorly onto the male end, thus giving rise to an unreliable locking arrangement.

FIGS. 4 to 7 illustrate different variants of the Joint in FIGS. 1 to 3. In FIG. 4, the faces 27 are slightly convex, thereby allowing greater angular deviations of the male end, which could reach approximately 10°. On the other hand, the pressures exerted on the three teeth are different from each other when the male end travels backwardly, since all of the reaction forces originate at the single point of contact 28 between the faces 26 and 27. The same remarks are applicable to another variant (not shown), in which the faces 26 are slightly rounded.

Figure 5:
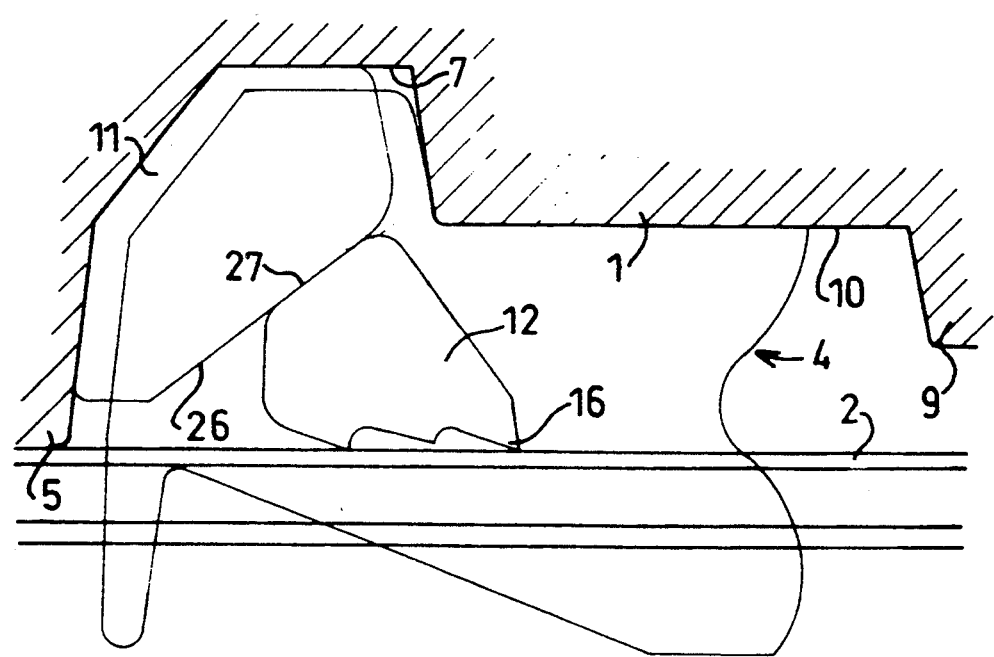

The variant in FIG. 5 differs from that in FIG. 3 only by virtue of the fact that the middle tooth 16 is set back radially in relation to the two end teeth. This facilitates the fastening of the inserts 12 to the male end, since, for a single stress, the initial pressures, which are exerted on only two teeth instead of three, are stronger. On the other hand, when the backward movement lo of the male end is terminated, the pressures are balanced among the three teeth. Moreover, in this variant and for the same reason, the teeth 16 do not have to be machined to give them a sharp edge.

Similar remarks apply to the variant in FIG. 6, in which, to the contrary, the middle tooth 16 projects radially in relation to the two end teeth, and to the variant in FIG. 7, in which the front tooth 16 is radially set back in relation to the two others. In this latter case, moreover, the forward fold of the lip 15 during the insertion of the male end entails less risk of interfering with the front tooth of the inserts.

In each embodiment, the inserts 11 and/or 12 can be electrically insulated so as to eliminate any electrical path of conduction between the two pipes.

We claim:

1. A pipe socket joint of the type comprising a male pipe end inserted in a female socket and a sealing gasket radially compressed between the pipe end and the socket, said gasket comprising an annular elastomer body defining, on a side closest to the socket inlet, an outwardly-projecting anchoring heel housed in an anchoring throat of the socket, a plurality of toothed metal inserts embedded in the elastomer and designed to retentively engage the male end, and a plurality of support members embedded in the anchoring heel and having an external shape matching the shape of the anchoring throat, the support members and the toothed inserts having linear, slideably engaged, inclined, substantially flat faces sloping in relation to an axis of the socket such that the inserts slide on the support members without undergoing rotation, thereby avoiding any substantial penetration of the insert teeth into the male pipe end and an attendant perforation thereof.

2. A pipe socket joint according to claim 1, wherein said support members and said toothed inserts are formed by a series of inserts made of a rigid material and spread out over the periphery of the joint.

3. A pipe socket joint according to claim 1, wherein each toothed insert has a plurality of teeth.

4. A pipe socket Joint according to claim 3, wherein the tips of all of the teeth are aligned along a line parallel to the axis of the socket when the inclined faces are reciprocally supported on each other.

5. A pipe socket joint according to claim 3, wherein the tip of at least one intermediate tooth is radially offset in relation to the other teeth.

6. A pipe socket joint according to claim 3, wherein the tip of at least one end tooth is radially offset in relation to the other teeth.

7. A pipe socket joint according to claim 1, wherein the average slope of the inclined faces (26, 27) is between approximately 20° and 40° in relation to the axis of the socket.

8. A sealing gasket for a joint between a male end of a first pipe inserted into a female socket end of a second pipe, the socket end successively defining, from an entrance thereof, a radially outwardly extending anchoring throat, and a generally cylindrical recess of smaller diameter than the throat, said gasket comprising:
   a) an annular elastomer body having a radially compressible inner portion adapted to be disposed between the male end and the recess, and a radially outwardly projecting anchoring heel adapted to be seated in the throat,
   b) a plurality of rigid support members embedded in the heel and distributed around the periphery of the gasket, said support members each having an outer shape mating with a shape of the throat and an inner face inclined to an axis of the socket end at an angle of 20° to 40°, and
   c) an equal plurality of metal inserts embedded in the elastomer body and distributed around the periphery of the gasket, said metal inserts each having an inclined outer face slideably engaged on and bearing against the inner face of an associated support member, and a toothed inner face for retentively engaging an inserted male end to prevent a withdrawal thereof.

* * * * *